(12) United States Patent
Tran et al.

(10) Patent No.: US 11,519,784 B2
(45) Date of Patent: Dec. 6, 2022

(54) THERMAL IMAGING RADAR

(71) Applicant: VIETTEL GROUP, Ha Noi (VN)

(72) Inventors: Duy Nhat Tran, Vinh (VN); Tien Hai Tran, Hanoi (VN); Quang Trung Trinh, Ha Noi (VN); Anh Dan Do, Ha Noi (VN)

(73) Assignee: VIETTEL GROUP, Ha Noi (VN)

( * ) Notice: Subject to any disclaimer, the term of this patent is extended or adjusted under 35 U.S.C. 154(b) by 40 days.

(21) Appl. No.: 17/315,906

(22) Filed: May 10, 2021

(65) Prior Publication Data
US 2021/0364358 A1 Nov. 25, 2021

(30) Foreign Application Priority Data

May 25, 2020 (VN) .............................. 1-2020-02942

(51) Int. Cl.
*G01J 5/04* (2006.01)
*G01J 5/02* (2022.01)
(Continued)

(52) U.S. Cl.
CPC .............. *G01J 5/047* (2013.01); *G01J 5/0205* (2013.01); *G01J 5/048* (2013.01); *G01J 5/10* (2013.01);
(Continued)

(58) Field of Classification Search
CPC .............. G01J 2005/0077; G01J 5/0022; G01J 5/0205; G01J 5/047; G01J 5/048; G01J 5/10; G03B 17/08; G03B 17/55; G03B 17/561; H04N 5/2251; H04N 5/2252; H04N 5/2253; H04N 5/2254; H04N 5/23203; H04N 5/23238; H04N 5/23299; H04N 5/33; H04N 7/18; H04N 7/185; H04N 1/00; H04N 3/00; H04N 5/00; H04N 7/00; H04N 9/00; H04N 11/00; H04N 13/00; H04N 17/00; H04N 19/00; H04N 21/00; H04N 2101/00; H04N 2201/00; H04N 2209/00; H04N 2213/00
See application file for complete search history.

(56) References Cited

U.S. PATENT DOCUMENTS 6,356,308 B1 * 3/2002 Hovanky ........... F16M 11/2014
348/211.1
8,174,612 B1 * 5/2012 Koehler ............. H04N 5/23238
248/292.12
(Continued)

*Primary Examiner* — Peter D Le
(74) *Attorney, Agent, or Firm* — Patenttm.US

(57) ABSTRACT

The invention proposed the thermal imaging radar includes of main components: Assembly pedestal, Assembly rotary shaft, and Assembly housing. Electronic circuits, encoders, mechanisms, motor are optimized arranged and scientifically designed the layout space and the weight of the structure. This device is compact for camouflage purposes, easy to assemble or disassemble, and waterproof. The invention's products can be applied in automatic security station, produces 360-degree panoramic imaging of the continuously day and night for surveillance area, detects and tracks moving objects captured by the thermal sensor. Furthermore, The product is also applicable for monitoring the ambient temperature in large areas, localizing high-temperature areas to recognize and warn the possible explosions.

7 Claims, 3 Drawing Sheets

(51) Int. Cl.
*H04N 5/232* (2006.01)
*H04N 5/225* (2006.01)
*G03B 17/08* (2021.01)
*G03B 17/55* (2021.01)
*G03B 17/56* (2021.01)
*G01J 5/10* (2006.01)
*H04N 7/18* (2006.01)
*G01J 5/00* (2022.01)

(52) U.S. Cl.
CPC .............. *G03B 17/08* (2013.01); *G03B 17/55* (2013.01); *G03B 17/561* (2013.01); *H04N 5/2252* (2013.01); *H04N 5/2253* (2013.01); *H04N 5/2254* (2013.01); *H04N 5/23203* (2013.01); *H04N 5/23299* (2018.08); *G01J 2005/0077* (2013.01); *H04N 5/23238* (2013.01); *H04N 7/18* (2013.01)

(56) References Cited

U.S. PATENT DOCUMENTS

| | | | | |
|---|---|---|---|---|
| 8,908,032 | B2* | 12/2014 | Bergstrom | G08B 13/19619 348/373 |
| 9,075,290 | B1* | 7/2015 | Thieman | F16M 13/022 |
| 10,217,210 | B2* | 2/2019 | Schmidt | G06T 7/001 |
| 10,492,314 | B2* | 11/2019 | Svedberg | H05K 5/0204 |
| 2001/0006218 | A1* | 7/2001 | Takada | G08B 13/19619 250/552 |
| 2004/0021044 | A1* | 2/2004 | Lindsay | F16M 11/10 248/372.1 |
| 2004/0042783 | A1* | 3/2004 | Diana | F16M 11/18 396/427 |
| 2004/0223755 | A1* | 11/2004 | Naganuma | G03B 9/08 396/463 |
| 2004/0263679 | A1* | 12/2004 | Wei | H04N 5/225 348/373 |
| 2005/0143624 | A1* | 6/2005 | Iddan | A61B 1/041 600/112 |
| 2006/0050150 | A1* | 3/2006 | Yamane | G08B 13/1963 348/151 |
| 2007/0058229 | A1* | 3/2007 | Hudyma | G02B 30/54 348/E13.058 |
| 2007/0208459 | A1* | 9/2007 | Choi | F41A 23/24 700/245 |
| 2007/0229991 | A1* | 10/2007 | Takenaka | G02B 7/102 359/819 |
| 2007/0297788 | A1* | 12/2007 | Wahl | H04N 5/2252 396/419 |
| 2008/0008467 | A1* | 1/2008 | Liu | H04N 5/2251 396/427 |
| 2008/0018487 | A1* | 1/2008 | Jao | G08B 13/1963 340/693.12 |
| 2008/0055409 | A1* | 3/2008 | Mars | G08B 13/19656 348/E5.026 |
| 2008/0068493 | A1* | 3/2008 | Hida | H04N 5/2254 348/E5.025 |
| 2008/0079848 | A1* | 4/2008 | Kung | H04N 5/2252 348/E5.026 |
| 2009/0052884 | A1* | 2/2009 | Lee | F16M 11/18 248/638 |
| 2010/0170971 | A1* | 7/2010 | Doglioni Majer | A47J 42/18 241/259.1 |
| 2010/0171681 | A1* | 7/2010 | Cabanas | G09G 3/005 345/31 |
| 2013/0104933 | A1* | 5/2013 | Aldred | G03B 17/561 134/6 |
| 2014/0240494 | A1* | 8/2014 | Wada | H04N 5/23299 348/143 |
| 2014/0247324 | A1* | 9/2014 | Cury | G03B 17/08 348/36 |
| 2014/0327764 | A1* | 11/2014 | Nelson | H04N 5/2252 348/373 |
| 2015/0015700 | A1* | 1/2015 | Becker | H04N 5/247 348/136 |
| 2015/0077720 | A1* | 3/2015 | Fukutomi | H04N 9/3188 353/121 |
| 2015/0078737 | A1* | 3/2015 | Albonico | G03B 19/026 396/48 |
| 2015/0288860 | A1* | 10/2015 | Chu | H04N 7/183 348/143 |
| 2016/0119513 | A1* | 4/2016 | Sasaki | G03B 17/02 348/373 |
| 2016/0182783 | A1* | 6/2016 | Basho | G03B 17/02 348/374 |
| 2016/0286101 | A1* | 9/2016 | Takeda | G03B 17/12 |
| 2017/0111554 | A1* | 4/2017 | Wada | H04N 5/2252 |
| 2017/0115480 | A1* | 4/2017 | Wada | G03B 15/02 |
| 2017/0115549 | A1* | 4/2017 | Wada | G03B 15/16 |
| 2017/0254469 | A1* | 9/2017 | Okamura | F16M 11/126 |
| 2017/0261836 | A1* | 9/2017 | Wada | G03B 17/561 |
| 2017/0307964 | A1* | 10/2017 | Okamoto | G03B 17/02 |
| 2018/0241915 | A1* | 8/2018 | Guan | H04N 5/23238 |
| 2018/0367738 | A1* | 12/2018 | Fukuzawa | H04N 5/23296 |
| 2019/0098189 | A1* | 3/2019 | Kimura | H04N 5/2254 |
| 2019/0163039 | A1* | 5/2019 | Zhang | B64C 39/024 |
| 2019/0387180 | A1* | 12/2019 | Ogata | H04N 7/181 |
| 2020/0213485 | A1* | 7/2020 | Rossi | H04N 5/232 |
| 2020/0292915 | A1* | 9/2020 | Kazuo | G03B 9/22 |
| 2020/0389597 | A1* | 12/2020 | Guan | F16M 13/027 |
| 2021/0058556 | A1* | 2/2021 | Kim | H04N 5/2251 |
| 2021/0165306 | A1* | 6/2021 | Guo | H04W 76/10 |
| 2021/0258515 | A1* | 8/2021 | Rees | H04N 5/23299 |

* cited by examiner

THERMAL IMAGING RADAR

TECHNICAL FIELD

The invention refers to thermal imaging radar, which can be used for automatic security stations. It produces 360-degree panoramic imaging continuously day and night for a surveillance area, detects and tracks moving objects captured by the thermal sensor. If objects violate the restricted area, it sends a warning to the security station. The content mentioned in the invention describes the design of products belonging to the class of optoelectronic device observations.

BACKGROUND OF THE INVENTION

In the published patent documents, some works have content concerning thermal imaging radar equipment. However, some shortcomings and limitations of the published inventions remain as follows:

The United States Published Patent Application No. U.S. Pat. No. 6,630,670 B2 "Thermal imaging system" published Nov. 7, 2003, describes the design of a system that produces thermal images to displays these to a user on a suitable display in real-time. The content of the invention mainly covers the logic block diagram of the system. Detailed design of the driving mechanism, the industrial design aren't mentioned in the content of the invention.

The United States Published Patent Application No. USD776181 S "Camera" published Apr. 6, 2015, describes the design of thermal camera equipment. The content of the invention mainly covers the industrial design of this equipment. Detailed design of the driving mechanism, arranging the space inside the method isn't mentioned in the content of the invention.

To overcome the above limitations, the authors of the Viettel Aerospace Institute propose thermal imaging radar used for automatic security stations on the ground or motor vehicle, unlike any other patents ever published.

BRIEF SUMMARY OF THE INVENTION

The purpose of the present invention is to describe in detail the design drive mechanism of thermal imaging radar. The system uses a direct drive motor and encoder to minimize the transmission error of the mechanism, integrating an electric commutator to ensure the rotation system $360°*n$. Furthermore, The thermal radar is compactly designed for camouflage purposes, IP65 water-resistant, the structure optimizes the layout space of microcontroller electronic circuits, electric commutators, direct-drive motors, and encoders as well as reducing the mass of the direct drive mechanism.

To achieve the above purpose, the authors propose to design a direct drive mechanism consisting of assembly parts shown in FIG. 1: Assembly pedestal, Assembly rotary shaft, and Assembly housing. Besides, The detailed parts in each assembly of the direct drive mechanism are detailed in FIG. 3.

The assembly pedestal consists of Pedestal mount, Central controller electronic circuit, Military connector, Motor, and slip-ring mounting bracket, Stator of Frameless motor, Mounting rotor, Rotor of Frameless motor, Rotary shaft, Mounting shaft, Bearing, Inner spacing part, Outer spacing part, Inner grommet, Outer grommet, Fixing inner bearing part, Slipring và Shaft mounting Encoder.

The assembly rotary shaft consists of Rotate table, Encoder, Encoder latch, Mounting image processing board, thermal camera module, Lens and Uncooled thermal imaging sensor.

The assembly housing consists of Main housing, Protective window, Lid.

All of The Lens, sensor, electronic circuit, motor, encoder, and auxiliary equipment are firmly fixed and protected by aluminum alloy frames.

The invention's products can be applied in automatic security station, produces 360-degree panoramic imaging continuously day and night for a surveillance area, detects and tracks moving objects captured by the thermal sensor. Furthermore, The product is also applicable for monitoring the ambient temperature in large areas, localizing high-temperature areas to recognize and warn the possible explosions.

DETAILED DESCRIPTION OF THE INVENTION

Figure 1:
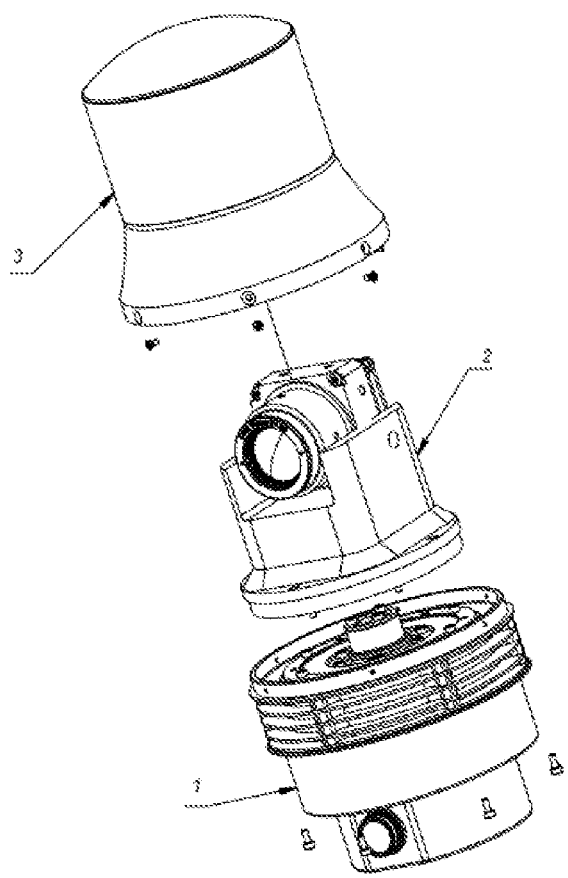
FIG. 1: Overview of the thermal imaging radar mechanical structure.
Figure 2:
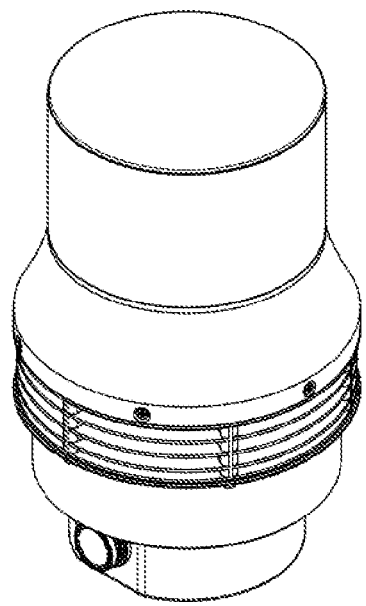
FIG. 2: Industrial design of thermal imaging radar.
Figure 3:
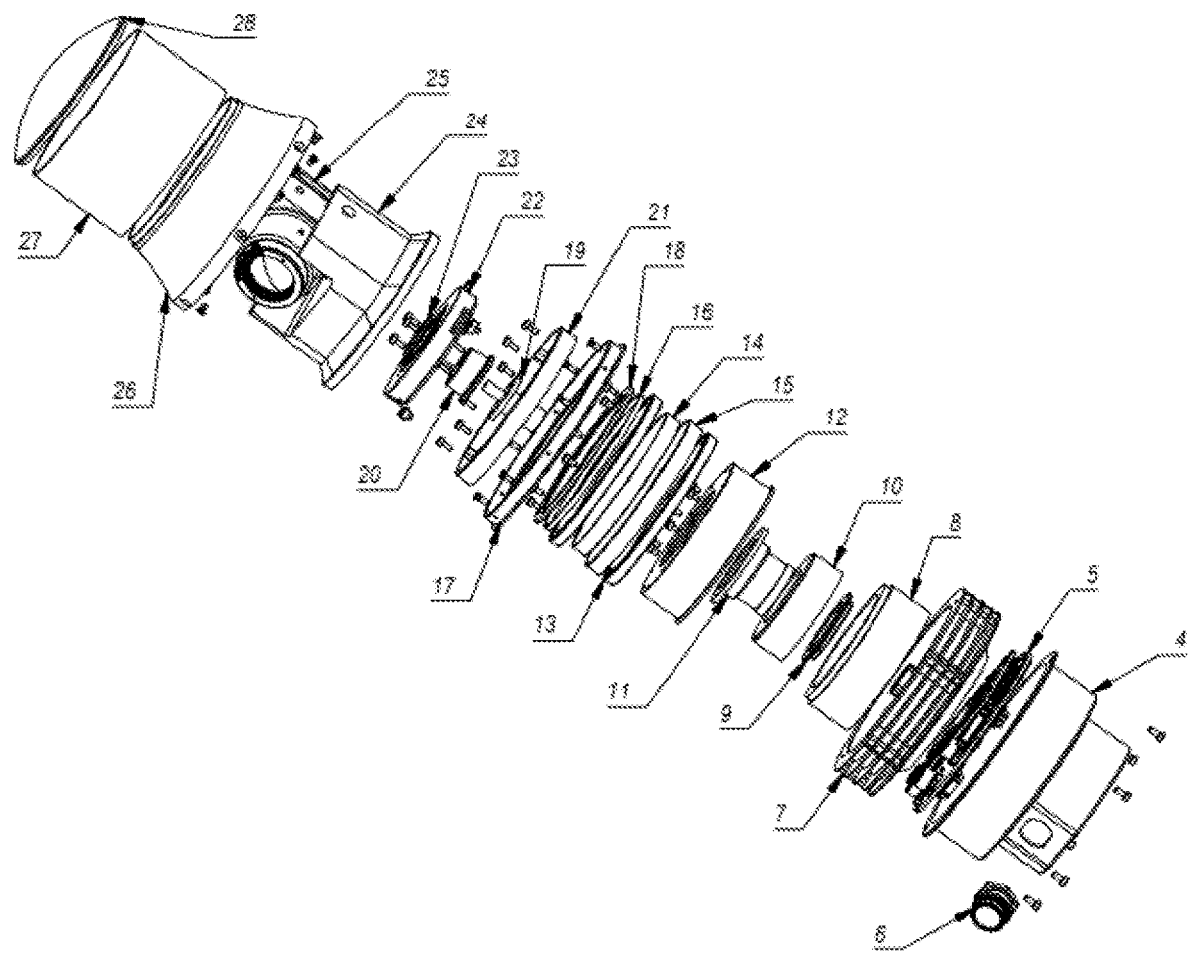
FIG. 3: Detailed of the mechanism.
Figure 4:
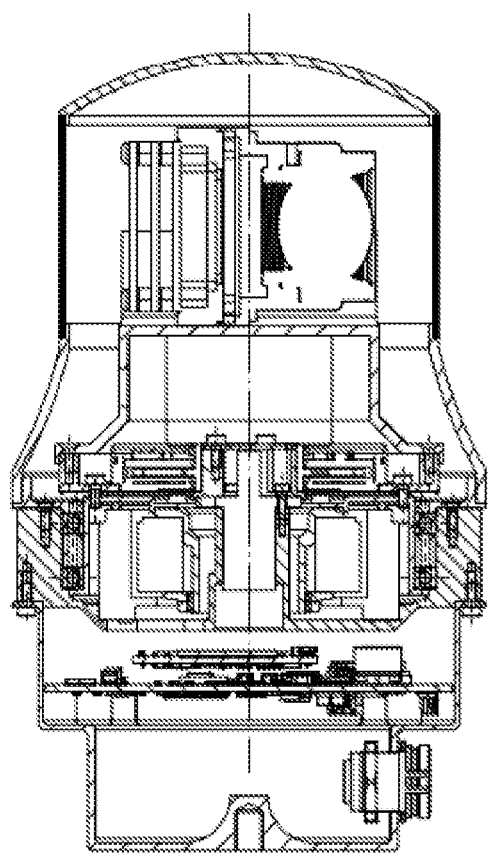
FIG. 4: Section view of the structure.

The main equipment assemblies of the thermal imaging radar include:

Assembly pedestal (1): this consists of a mechanical part, central processing electronic circuit, and direct drive mechanism, connecting the structure with motorized device or ground observation system, coordinating the general operation of the structure and performing the rotation drive. Besides protecting the internal equipment from the environment; The mechanical part has a compact design for easy assembly.

Pedestal mount (4): is a mechanical part made of aluminum alloy used to mount the mechanism to the Pedestal by a bolted joint. It's also used to protect Central processing electronic circuit (5), to mount Military connector (6), and connect Motor and slip-ring mounting bracket (7);

Central controller electronic circuit (5): is an electronic circuit that coordinates the general operation of the structure, communicates with peripheral devices to receive control commands, receive data and issue warning and control signals to other components in the system;

Military connector (6) ensures waterproof for output, including power lines and internet;

Motor and slip-ring mounting bracket (7): is a mechanical part made from aluminum alloy used to fix the motor stator and slip-ring;

Stator of Frameless motor (8): is the stationary part of frameless motor fixed in Motor and slip-ring mounting bracket by bolt joint;

Mounting rotor (9) is a precision rotating mechanical part used to clamp the rotor to the rotary shaft by bolt joint;

Rotor of Frameless motor (10): is a rotating part of the frameless motor;

Rotary shaft (11): is a precision rotating mechanical part used to transmit the shaft rotation motion from the frameless motor;

Mounting shaft (12): is a precision rotating mechanical part used to rotary shaft and in contact with Thin Section Bearing (13), protects the frameless motor;

Thin Section Bearing (13): is the super slim standard bearing but ensuring the load and durability; Besides reducing the friction of axial rotation function, this bearing optimizes the layout space and mass of mechanism;

Moreover, according to the invention execution ideal, Thin Section Bearing (13) needs to use Inner spacing part (14), Outer spacing part (15), Inner grommet (16), Outer grommet (17). With:

+Inner spacing part (14): is a rotating mechanical part used to determine the distance of the inner ring of two Thin Section Bearing (13);

+Outer spacing part (15): is a rotating mechanical part used to determine the distance of the outer ring of two Thin Section Bearing (13);

+Inner grommet (16): is a rotating mechanical part used to tighten the inner ring of two Thin Section Bearing (13);

+Outer grommet (17): is a rotating mechanical part used to tighten the outer ring of two Thin Section Bearing (13);

Fixing inner bearing part (18): is a rotating mechanical part used to fix, protect the Thin Section Bearing mechanism (13), connect with Assembly rotary shaft (2);

Slipring (19): is a standard rotating part that ensures that this device rotates continuously 360° with the same velocity of the frameless motor, use to transmit the power and signal;

Shaft mounting Encoder (20): is a rotating mechanical part used to mount the rotation of the encoder.

According to the invention ideal, at Assembly pedestal (1), Central controller electronic circuit (5) is better if designed in a circular shape that fits perfectly into Pedestal mount (4). It has the form of evenly spaced bars to dissipate the heat of device; total heat source of device transfer to pedestal mount and dissipate outside environment, protect electronic circuit inside of sealed housing. All outer joints are filled with adhesive and waterproof gaskets.

Assembly rotary shaft (2) is composed of mechanical parts, Electronic circuit blocks, and a thermal camera module connecting the Assembly pedestal. It has a compact design with hole/shaft joint and clamped by bolts, the direction of mounting bolts from top to bottom helps easily assembly or disassembly.

According to the invention implementation, Assembly rotary shaft (2) consists of Rotate table (21), encoder (22), Encoder latch (23), Mounting image processing board and thermal camera module (24), Lens and Uncooled thermal imaging sensor (25).

At each substructure of the Assembly rotary shaft (2), the differences are:

Rotate table (21): is a precision mechanical part made of aluminum alloy used to cover encoder (22), connect with Mounting image processing board and thermal camera module (24) by bolt joints.

Encoder (22): is a standard device used to measure actual device speed and feedback value to the central processing circuit, The reader and ring of an encoder is integrated with the round type to optimize the space of the device.

Encoder latch (23): is a mechanical part used to mount encoder (22) to a Rotary shaft.

Mounting image processing board and thermal camera module (24) is a mechanical part made from aluminum alloy to connect with Rotate table (21) by hole/shaft joint and clamp by bolts. The underside of part mounts image processing circuit, Upside of part mounts Lens and Uncooled thermal imaging sensor (25) help minimize the number of mounting parts, integrate times and optimizes the layout space for Lens and Uncooled thermal imaging sensor (25).

Lens and Uncooled thermal imaging sensor (25) is an optical assembly used to receive thermal image signal to handle related tasks.

According to the implementation of the invention, at Assembly rotary shaft (2), the image processing circuit is better if designed in a square shape fit into Underside of Mounting image processing board and thermal camera module (24), a connector of the circuit downward to slip ring (19) to avoid getting stuck when this device works. Mounting image processing board and thermal camera module (24) has designed an output hole in the side to connect with a connector of Lens and Uncooled thermal imaging sensor (25) in the top. Encoder (22) and Mounting image processing board and thermal camera module (24) fixed by hole/shaft joint with Rotate table to ensure to be coaxial with axis. Assembly or disassembly of the Assembly rotary shaft is more easily (2) by the bolt-tightening method. To ensure no interference during thermal imaging radar working, Rotate table and Mounting image processing board and thermal camera module (24) are anodized with black color and rough surface to prevent diffraction to the device.

Assembly housing (3) consists of a protective window and a plastic cover protects the Assembly rotary shaft from external environmental agents and waterproofs the device.

According to the implementation of the invention, Assembly housing (3) consists of Main housing (26), Protective window (27), Lid (28).

Main housing (26) is a rotating mechanical part made from plastic used to connect with Motor and slip-ring mounting bracket (7) and Protective window (27).

Protective window (27) is an optical part made from infrared glass that ensures the transmission of thermal radiation to a sensor.

Lid (28) is a plastic cover that has a spherical shape used to cover the top of the device and prevent water stagnation during long outdoor operation.

According to the implementation of the invention, at Assembly housing (3), Assembly is done by hole/shaft joint and waterproof adhesive. To ensure that the ambient pressure inside and outside the device is balanced, the housing is integrated with a pressure relief valve and a desiccant bag on the inside.

Assembly pedestal (1) and Assembly rotary shaft (2) are connected through Fixing inner bearing part (18) and Rotate table (21) by hole/shaft joint and clamped by bolts. Assembly housing (3) is connected with Assembly pedestal (1) by hole/shaft joint and waterproof adhesive through Motor and slip-ring mounting bracket (7) and Main housing (26).

When performing the task, the central controller electronic circuit (5) communicates, controls, and sends the value of rotation angle, speed of rotation angle . . . from encoder through slip ring (19), calculates and gives appropriate control parameters for the motor. The direct frameless motor drives the Assembly rotary shaft (2) through Rotary shaft (11) and Thin Section Bearing (13) to reduce rotation friction. Lenses and thermal image sensors collect data from the environment to the image processing circuit and then to the central controller electronic circuit.

Using inner space of the shaft motor to arrange slip-ring (19), take Mounting shaft (12) outside the motor, using 2 thin section bearing (13), select encoder include reader and ring has round type that helps saving layout space, optimized weight, eliminating the intermediate transmission mechanism (e.g. gear system, belt).

Therefore, The dimension of Assembly pedestal (1) depends only on the diameter of the motor. The selection of Lens and Uncooled thermal imaging sensor (25) depend on the desired diameter of the motor, the size should not be larger than the motor size. Assembly housing (3) has the tapered and cylindrical shape fit thermal imaging camera to prevent the water condensation on the Assembly housing when the device working for a long time on the outside.

All of the shape mechanical components, shape electronic circuits are designed to fill the entire remaining space of the device. Therefore, the mechanism optimizes the space inside the protective shell.

Besides, the mechanical parts made of aluminum alloy are added hardened ribs and anodized to make sure of the hardened structure, optimize the weight, as well as isolate the electronic circuit blocks. The types of aluminum alloys that can be used are 6061-T6, 2017. That alloys have similar physical and thermal properties, choosing production suitable materials of mechanical parts depends on the aluminum workpiece available on the market. The outer surface of the protective cover can be painted in camouflage colors for military use.

The invention claimed is:

1. Thermal imaging radar includes: an Assembly pedestal, an Assembly rotary shaft, and an Assembly housing,
   the Assembly pedestal includes:
   a Pedestal mount which is a mechanical part made of aluminum alloy used to mount to the Pedestal by a bolted joint, It's also used to protect a Central processing electronic circuit, to mount a Military connector, and connect a Motor and slip-ring mounting bracket,
   a Central controller electronic circuit is an electronic circuit that coordinates the general operation of the structure, communicates with peripheral devices to receive control commands, receive data and issue warning and control signals to other components,
   the Military connector ensures waterproof for output, including power lines and internet,
   the Motor and slip-ring mounting bracket is a mechanical part made from aluminum alloy used to fix a motor stator and slip-ring,
   a Stator of Frameless motor is a stationary part of a frameless motor fixed in the Motor and slip-ring mounting bracket by a bolt joint,
   a Mounting rotor is a precision rotating mechanical part used to clamp the mounting rotor to a rotary shaft by a bolt joint,
   a Rotor of Frameless motor is a rotating part of the frameless motor,
   a Rotary shaft is a precision rotating mechanical part used to transmit the shaft rotation motion from the frameless motor,
   a Mounting shaft is a precision rotating mechanical part used to connect to the rotary shaft and in contact with a Thin Section Bearing, protects the frameless motor,
   The Thin Section Bearing is a super slim standard bearing but ensuring load and durability; Besides reducing a friction of axial rotation function, this bearing optimizes layout space and mass of mechanism,
   A Slipring is a rotating part that ensures that this device rotates continuously 360° with a same velocity of the frameless motor, used to transmit power and signal,
   A Shaft mounting Encoder is a rotating mechanical part used to mount the rotation of an encoder;
   The Assembly rotary shaft includes:
   A Rotate table which is a precision mechanical part made of aluminum alloy used to cover the encoder and connect with Mounting image processing board and thermal camera module by bolt joints,
   The Encoder is a standard device used to measure actual device speed and feedback value to the central controller circuit, a reader and ring of the encoder is integrated with the round type to optimize the space of the Thermal imaging radar,
   an Encoder latch is a mechanical part used to mount the encoder to a Rotary shaft,
   a Mounting image processing board and thermal camera module is a mechanical part made from aluminum alloy to connect with the Rotate table by hole/shaft joint and clamp by bolts, an underside mounts image processing circuit, an upper side mounts Lens and Uncooled thermal imaging sensor;
   the Assembly housing includes:
   a Main housing is a rotating mechanical part made from plastic used to connect with a Motor and slip-ring mounting bracket and a Protective window,
   the Protective window is an optical part made from infrared glass that ensures transmission of thermal radiation to a sensor,
   a Lid is a plastic cover that has a spherical shape used to cover the top of the thermal imaging radar and prevent water stagnation during long outdoor operation.

2. Thermal imaging radar according to claim 1 wherein the Assembly pedestal, Central controller electronic circuit is designed in a circular shape that fits perfectly into the Pedestal mount, It has the form of evenly spaced bars to dissipate heat of the thermal imaging radar; total heat source of the thermal imaging radar transfers to the pedestal mount and dissipates to an outside environment, protect electronic circuit inside of a sealed housing, All outer joints are filled with adhesive and waterproof gaskets.

3. Thermal imaging radar according to claim 1 wherein the Assembly rotary shaft, the image processing circuit is designed in a square shape fit into an Underside of a Mounting of the image processing board and thermal camera module, a connector of the circuit downward to slip ring to avoid getting stuck; Mounting image processing board and thermal camera module has designed an output hole in the side to connect with a connector of a Lens and Uncooled thermal imaging sensor in the top; Encoder and Mounting image processing board and thermal camera module fixed by a hole/shaft joint with the Rotate table to be coaxial with axis; Assembly or disassembly of the Assembly rotary shaft is more easily accomplished by a bolt-tightening method.

4. Thermal imaging radar according to claim 1 wherein the Assembly housing is assembled by hole/shaft joint and waterproof adhesive, To ensure that an ambient pressure inside and outside the device is balanced, the housing is integrated with a pressure relief valve and a desiccant bag on the inside.

5. Thermal imaging radar according to claim 1 wherein the selection of a Lens and Uncooled thermal imaging sensor depends on a desired diameter of the motor, the size should not be larger than the motor size, the Assembly housing has a tapered and cylindrical shape to fit thermal imaging camera to prevent the water condensation on the Assembly housing when the device is working for a long time on the outside.

6. Thermal imaging radar according to claim 1 wherein mechanical parts of the mechanism is made of aluminum alloy; Rotate table and Mounting image processing board and thermal camera module (24) are anodized with black color and rough surface to prevent diffraction to the device; the outer surface of the protective cover can be painted in camouflage colors for military use.

7. Thermal imaging radar according to claim 1 wherein the Assembly pedestal and Assembly rotary shaft are connected through a Fixing inner bearing part and the Rotate table by hole/shaft joint and clamped by bolts, the Assembly housing is connected with the Assembly pedestal by hole/shaft joint and waterproof adhesive through Motor and slip-ring mounting bracket and Main housing.

\* \* \* \* \*